(12) United States Patent
Swaminathan et al.

(10) Patent No.: US 12,365,084 B2
(45) Date of Patent: Jul. 22, 2025

(54) SYSTEM AND METHOD FOR OBJECT DETECTOR TRAINING

(71) Applicant: Intrinsic Innovation LLC, Mountain View, CA (US)

(72) Inventors: Sivaramakrishnan Swaminathan, Mountain View, CA (US); Eyrun Eyjolfsdottir, Kopavogur (IS)

(73) Assignee: Intrinsic Innovation LLC, Mountain View, CA (US)

( * ) Notice: Subject to any disclaimer, the term of this patent is extended or adjusted under 35 U.S.C. 154(b) by 262 days.

(21) Appl. No.: 17/988,678

(22) Filed: Nov. 16, 2022

(65) Prior Publication Data

US 2023/0150124 A1    May 18, 2023

Related U.S. Application Data

(60) Provisional application No. 63/280,028, filed on Nov. 16, 2021.

(51) Int. Cl.
| | |
|---|---|
| *B25J 9/16* | (2006.01) |
| *G06T 7/30* | (2017.01) |
| *G06T 15/20* | (2011.01) |
| *G06T 17/20* | (2006.01) |

(52) U.S. Cl.
CPC ............. *B25J 9/1612* (2013.01); *G06T 7/30* (2017.01); *G06T 15/20* (2013.01); *G06T 17/20* (2013.01)

(58) Field of Classification Search
CPC ...... B25J 9/1612; B25J 9/1669; B25J 9/1679; B25J 9/163; B25J 9/16; G06T 7/30; G06T 15/20; G06T 17/20; G05B 2219/39508; G05B 2219/40532; G05B 2219/40565
See application file for complete search history.

(56) References Cited

U.S. PATENT DOCUMENTS

| | | | |
|---|---|---|---|
| 11,275,942 B2 * | 3/2022 | Eyjolfsdottir | G06T 15/04 |
| 11,691,273 B2 * | 7/2023 | Konolige | G06T 7/75 |
| | | | 382/154 |
| 2018/0350134 A1 * | 12/2018 | Lodato | G06T 17/20 |
| 2019/0340829 A1 * | 11/2019 | Marshall | G06T 19/20 |
| 2020/0306964 A1 * | 10/2020 | Neville | B25J 9/1661 |
| 2021/0023715 A1 * | 1/2021 | Zhang | B25J 9/1692 |
| 2021/0192784 A1 * | 6/2021 | Taylor | B25J 9/1612 |
| 2022/0016765 A1 * | 1/2022 | Ku | G05B 19/4155 |

(Continued)

FOREIGN PATENT DOCUMENTS

| | | | | |
|---|---|---|---|---|
| EP | 3596657 A1 * | 1/2020 | | G06K 9/00214 |
| WO | WO-2019023954 A1 * | 2/2019 | | H04N 5/232 |

*Primary Examiner* — Ramon A. Mercado
*Assistant Examiner* — Tyler Roger Robarge
(74) *Attorney, Agent, or Firm* — Fish & Richardson P.C.

(57) ABSTRACT

Methods, systems, and apparatus, including computer programs encoded on computer storage media, for automatically generating object representations. One of the methods includes grasping, by a robot, an object at a first grasp point and generating a first partial object mesh based on one or more first sensor measurements of the object when held by the robot at the first grasp point. A second grasp point is identified for the object that is located in a region captured by the one or more first sensor measurements. A second partial object mesh is generated based on one or more second sensor measurements of the object when held by the robot at the second grasp point.

14 Claims, 10 Drawing Sheets

(56) References Cited

U.S. PATENT DOCUMENTS

| | | | |
|---|---|---|---|
| 2022/0019799 A1* | 1/2022 | Eyjolfsdottir | H04N 23/90 |
| 2023/0041378 A1* | 2/2023 | Abouelela | G06V 10/7715 |
| 2024/0296662 A1* | 9/2024 | Solowjow | G06T 15/20 |

* cited by examiner

SYSTEM AND METHOD FOR OBJECT DETECTOR TRAINING

CROSS-REFERENCE TO RELATED APPLICATIONS

This application claims the benefit under 35 U.S.C. § 119(e) of the filing date of U.S. Provisional Patent Application No. 63/280,028, filed on Nov. 16, 2021, entitled "System and Method for Object Detector Training," the entirety of which is herein incorporated by reference.

TECHNICAL FIELD

This specification relates generally to the computer vision field, and more specifically to a new and useful method for object detector training.

SUMMARY

This specification describes how a system can automatically generate object representations for training an object detector. As shown in FIG. 1, the object detector training method can include: grasping an object S100, determining a set of measurements of the object S200, generating an object representation using the set of measurements S300, repeating S100-S300, generating a final object representation S500, and/or training an object detector based on the final object representation S600. In variants, the method can function to automatically generate an object representation of a previously unknown object, which can be used to train one or more object detectors for a grasping robot.

As one example, an object detector can be trained online (e.g., during deployment, during use). For example, for a pile of objects (e.g., in a bin), one object is randomly selected and grasped by an end effector affixed to a robotic arm. Measurements (e.g., RGB images, depth images, etc.) of the object can be sampled from predetermined poses relative to the robotic arm. The set of measurements acquired are then used to generate a partial mesh of the object (e.g., a mesh of all visible portions of the object). A second object is selected (e.g., where the second object can be the same first object instance or a different object instance), and the process is repeated. The second object can be grasped using a model trained to grasp features from the partial mesh (e.g., wherein the measured portion of the object—represented by the partial mesh—is used to train the model), randomly grasped, or otherwise grasped. Once the mesh represents a complete object (e.g., based on an angle between one or more meshes exceeding a threshold angle, based on an alignment error threshold, based on a mesh confidence level, based on end effector grasping locations, etc.) and/or another coverage condition is satisfied, a final mesh is generated based on the measurement sets (e.g., underlying the partial meshes). The complete mesh (or measurements underlying the complete mesh) can then be used to train an object detector, which can subsequently be used to identify, select, and grasp objects from object piles.

Particular embodiments of the subject matter described in this specification can be implemented so as to realize one or more of the following advantages. Variants of the technology can confer one or more advantages over conventional technologies. First, variants of the method can enable faster training of an object detector for a grasping robot system. Previous systems utilized separate training systems (e.g., to generate training images, to determine object information, etc.) and/or required the training to be completed (or partially completed) prior to grasping. With this method, the training can be conducted: without a separate training system, while grasping the object, while the grasping robot is online, without training data about the object previously collected or generated, and/or concurrently with training data generation. Second, variants of the method can further accelerate object detector training by training an intermediate object detector to identify a partial object representation, wherein the intermediate object detector can be used to more reliably determine a re-grasp location and/or orientation for the same or a matching object (e.g., to generate the complete object representation). Third, variants of the method can enable the automatic generation of training data and automatic training of an object detector. This automation enables a scalable and adaptable system which can easily accept new types of objects with minimal or no manual input, additional training data being acquired, and/or reconfiguration of the system. Further advantages can be provided by the system and method disclosed herein.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

The following description of the embodiments of the invention is not intended to limit the invention to these embodiments, but rather to enable any person skilled in the art to make and use this invention.

Figure 2:
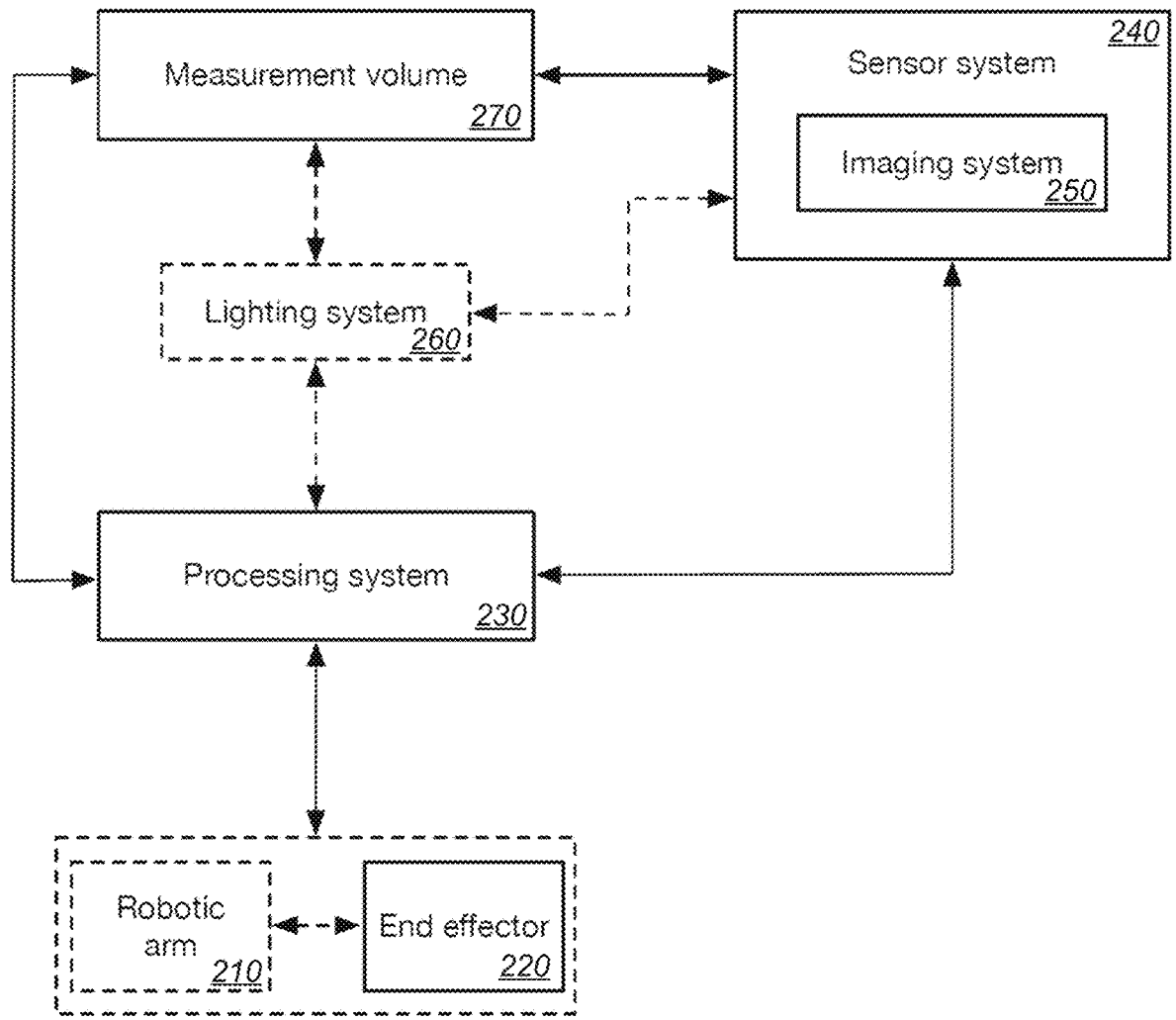
FIG. 2 illustrates an example system.

FIG. 2 illustrates an example system. The object detector training method can be performed using a system including: an end effector 220 (e.g., suction cup, gripper, etc.), a robotic arm 210 (e.g., including one or more actuatable joints), a computer processing system 230 (e.g., local or remote from the robot; configured to perform one or more of the methods discussed herein and/or control robot operation; etc.), a sensor system 240 (e.g., imaging system 250, actuation feedback system, etc.), a lighting system 260, and/or other components. An example of the system is shown in FIG. 2.

The imaging system can function to capture images and/or depth information of one or more objects (e.g., within a measurement volume 270). The measurement volume can define a region of space within which objects can be measured. The imaging system can include a depth sensor, a color sensor, and/or any other appropriate sensor. The imaging system can be statically mounted (e.g., to an imaging system actuator, to a static housing, etc.), actuatable, and/or otherwise mounted relative to the measurement volume, end-effector and/or any other system component.

The system can be implemented using techniques described in U.S. patent application Ser. No. 17/375,424, entitled, "Method and System for Object Grasping," filed Jul. 14, 2021; and U.S. application Ser. No. 17/375,331, entitled, "Method and System for Generating Training Data," filed Jul. 14, 2021, now U.S. Pat. No. 11,275,942, each of which is incorporated by reference in its entirety.

However, the method can also be performed with any other suitable system.

Figure 1:
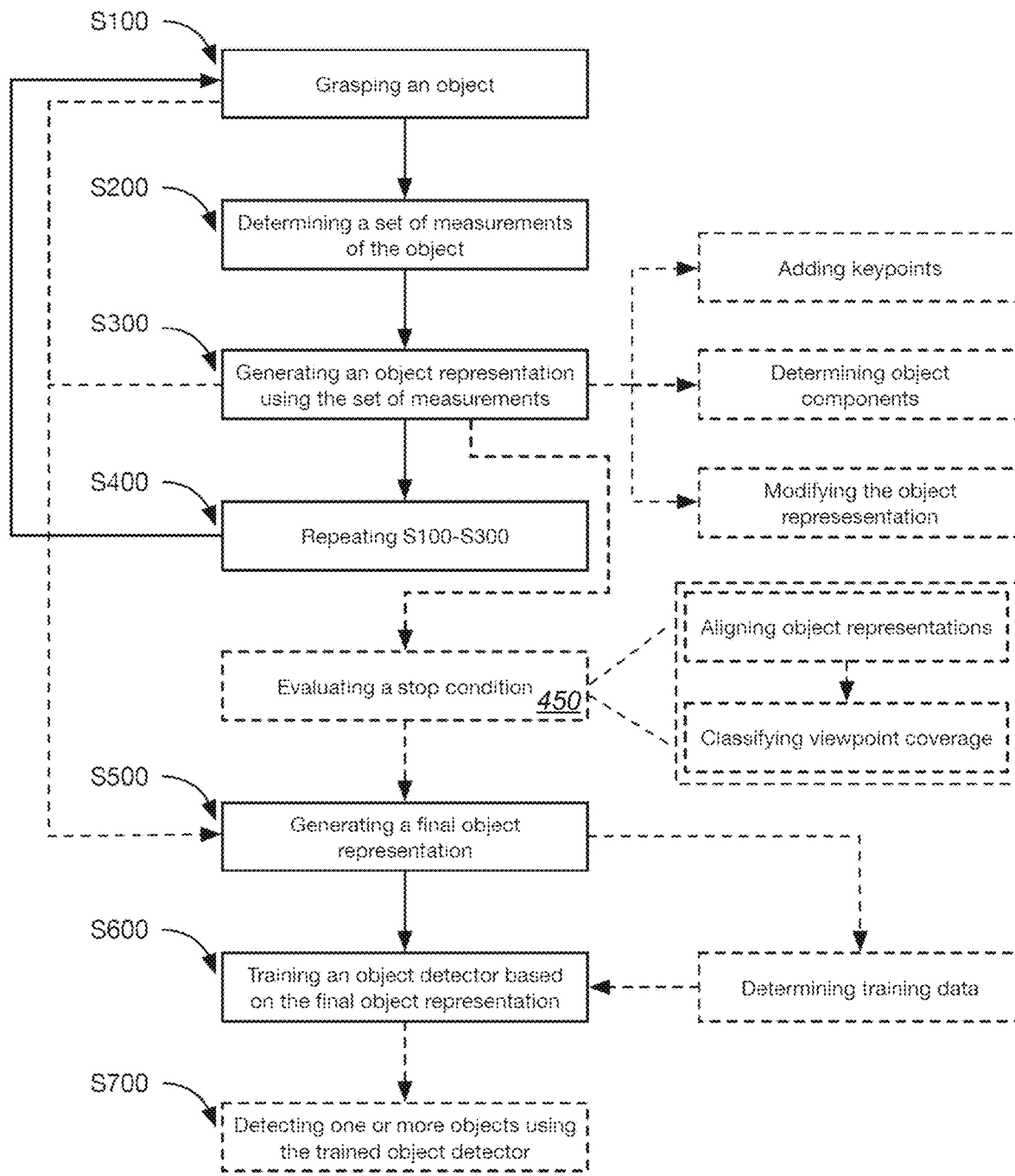
FIG. 1 illustrates an example method.

As shown in FIG. 1, the object detector training method can include: grasping an object S100, determining a set of measurements of the object S200, generating an object representation using the set of measurements S300, repeating S100-S300 for a second object S400, generating a final object representation S500, and/or training an object detector based on the final object representation S600.

Figure 3:
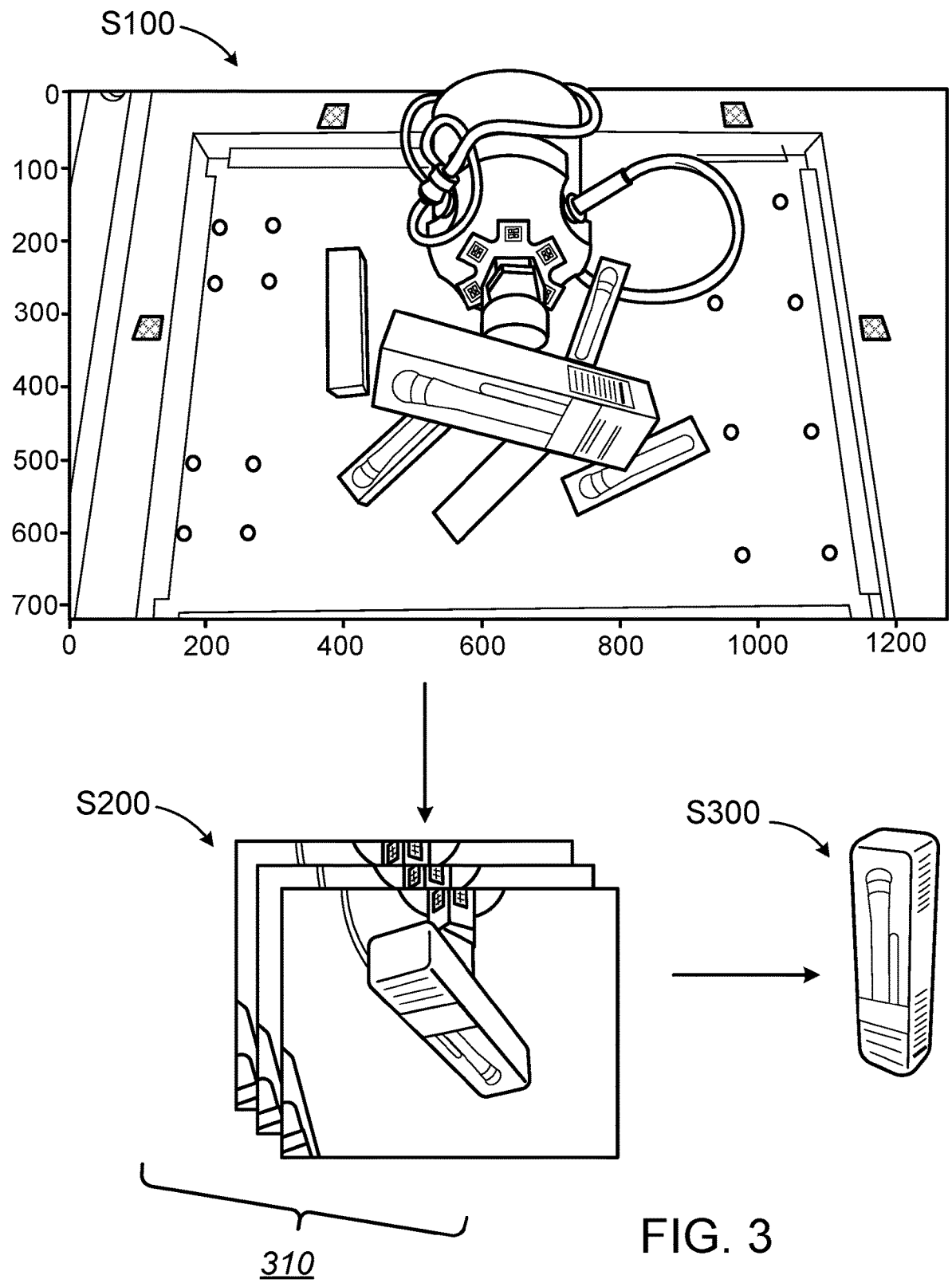
FIG. 3 depicts an example of measurement determination.

FIG. 3 illustrates steps S100, S200, and S300. In S100, an object is grasped from a bin of objects. In S200, a plurality of measurements 310 are taken for the object from a plurality of different poses and grasps. In S300, an object representation is generated.

Referring back to FIG. 1, the method can function to generate an object representation of a previously unknown object, which can be used to train one or more object detectors for a grasping robot. All or portions of the method can be performed once for a given object, performed once for a given object type (e.g., where two sets of measurements are acquired for two different instances of a matching object type), performed for multiple objects at once, performed in conjunction with other training methods, and/or at any suitable time. All or a portion of the method can be performed automatically, manually, semi-automatically, and/or otherwise performed. All or a portion of the method can be performed online (e.g., in the execution environment, as the measurements are being sampled), offline (e.g., after training data is captured), and/or otherwise performed.

Grasping an object S100 functions to obtain a physical object instance to measure. S100 is preferably performed by the end effector, but can alternatively be performed by another system. S100 can be performed with no, partial, or complete prior object parameter knowledge (e.g., retrieved parameters, parameters and/or an object representation based on one or more measurements, an object representation based on a generated partial or complete object representation, etc.). Object parameters can include material properties (e.g., material composition, transparency, reflectivity, etc.), size, geometry, texture, color, symmetry properties, name, ID, and/or any other parameter.

The object can be grasped from a plurality of objects (e.g., in the measurement volume, a bin, a pile, a shelf, etc.) or can be a singular object. The plurality of objects can be homogeneous (e.g., identical and/or duplicative instances of a particular type of object, same object class, etc.) or heterogeneous. The plurality of objects can be overlapping or non-overlapping, in a random pose or in a predetermined pose, and/or otherwise arranged. The object can be selected from one or more of the following: randomly (e.g., by executing a set of random grasps), when the object is at the top (e.g., determined based on bin depth, distance information, occlusion information, measurements, etc.), based on a distance to the end effector, when the object is the most graspable object (e.g., based on an image of the measurement volume, candidate grasp poses, etc.), a previously grasped object, an object that has not been previously grasped, using a trained object detector (e.g., trained on a partial representation of the object), and/or otherwise selected.

Grasping the object can be performed with an agnostic grasp (e.g., without determining object keypoints and/or grasping locations) or a targeted grasp. The grasp can be based on a predetermined grasping pose and/or end effector path (e.g., to explore the measurement volume), based on the object centroid location (e.g., to position the end effector near the object centroid), based on a detected failed grasp attempt (e.g., to reposition if failed attempt), using other heuristics or rulesets, and/or any other agnostic grasping technique.

However, grasping an object can be otherwise performed.

Determining a set of measurements of the object S200 can function to determine one or more measurements for generation of an object representation. S200 can use the imaging system, lighting system, robotic arm, and/or any other suitable system.

The set of measurements can include: images (e.g., stereoimage, single frame, video, etc.), depth measurements (e.g., of a point, of region, etc.), lighting measurements, and/or any other measurements. Each measurement (or subset of measurements) in the set can be of the object in a different object orientation relative to the sensor system and/or with a different environment context (e.g., different lighting, different visual obfuscation, etc.). The measurements can be 2D, 3D (e.g., depth map, point cloud, etc.), and/or have any other suitable set of dimensions. Each measurement can be associated with: a time, object pose and/or end effector pose (e.g., distance from a reference point, orientation relative to a reference point or coordinate system, such as the robot coordinates, scene coordinates, image coordinates, etc.), environment context (e.g., lighting conditions), sampling parameters (e.g., frequency), scale, and/or any other suitable information. In variants, the end effector pose can be used as a proxy for the object pose. In a first example, the end effector pose can be determined and/or refined based on one or more ArUco markers and/or other visual indicators mounted to known locations on the robotic arm and/or end effector (e.g., example shown in FIG. 3). In a second example, the end effector pose can be determined from the end effector controller. However, the end effector pose and/or object pose can be otherwise determined.

Determining the set of measurements can include sampling one or more measurements associated with one or more object poses. Preferably, the object poses are positioned and oriented using the same end effector grasp in S100, but alternatively a different grasp and/or end effector can be used (e.g., the object can be handed off to another end effector), the grasp can change between poses, and/or the object can be otherwise positioned.

In a first variant, the object poses can be set by robotic arm actuation, which positions and orients the end effector (e.g., while grasping the object) relative to the imaging system. In a first embodiment, the robotic arm moves in a series of predetermined motions (e.g., such that resultant measurements encompass a threshold range of viewpoints, to capture one or more known end effector poses, etc.), example shown in FIG. 9.

Figure 9:
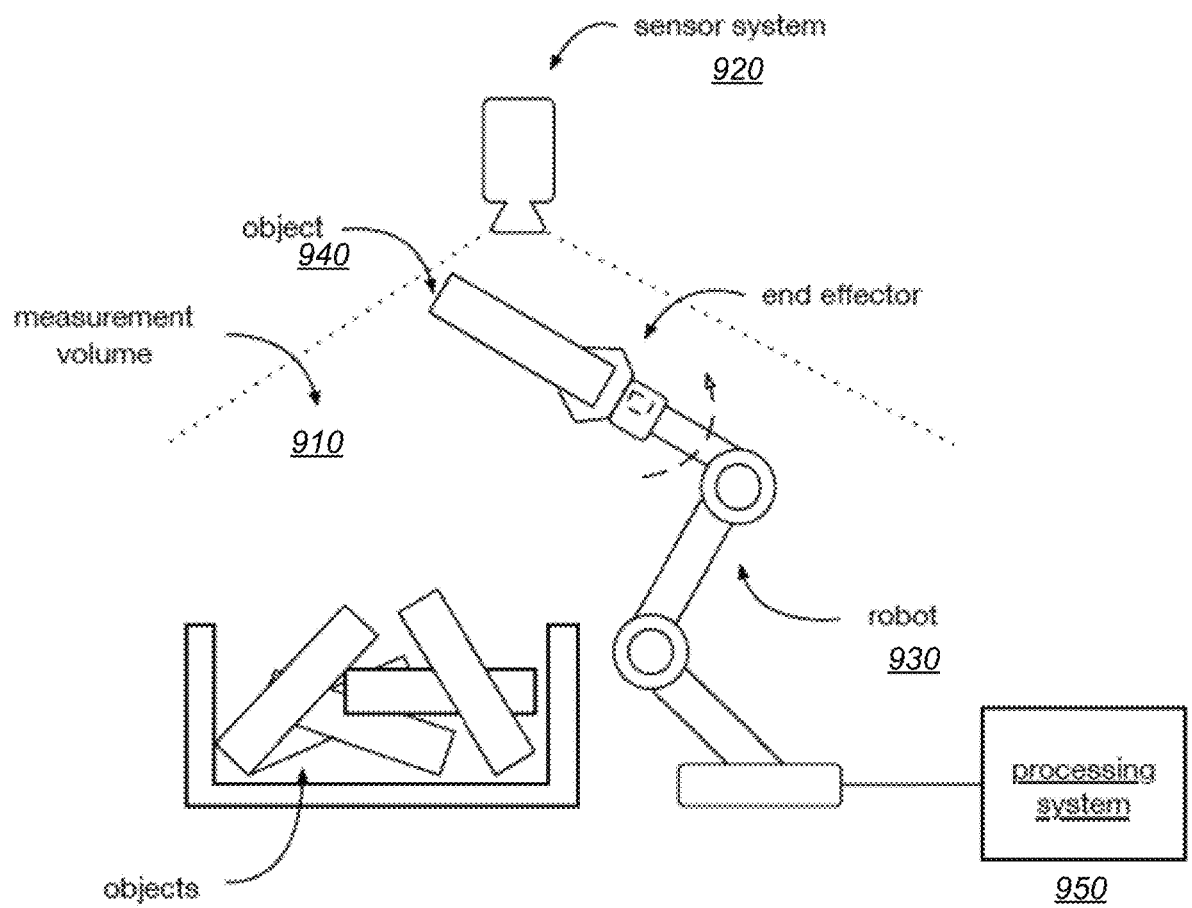
FIG. 9 is a schematic representation of an example of the system.

FIG. 9 illustrates a measurement volume 910 that is within a field of view of a sensor system 920. A robot 930 grasps an object 940 and moves the object 940 through the measurement volume 910 so that the sensor system 920 can, with the aid of processing system 950, obtain sets of measurements for the object 940.

In a second embodiment, the robotic arm motion is not predetermined and/or not specifically targeted to show the object to the imaging system with different orientations (e.g., the robot is moving to accomplish another task while these measurements are taken secondarily). An example is shown in FIG. 3.

In a second variant, the sensor system can be actuated relative to the object and/or the end effector (e.g., with an actuated imaging system to position and orient the imaging system relative to the object). The sensor system can be actuated with a predetermined or non-predetermined set of motions.

In a third variant, the measurements can be taken with one or more environment contexts (e.g., the same object poses under different environment contexts). The environment context can include lighting, sampling parameters, and/or any other context. In a first embodiment, the environment context can be changed between each pose. In a second embodiment, the environment context can be maintained for a first set of measurements (corresponding to one or more poses), then changed and maintained at a new context for a second set of measurements. In a third embodiment, the environment context can be adjusted (e.g., followed by the repetition of a portion or the entirety of the method) after S300 (e.g., different meshes for different environment contexts), after S600 (e.g., different object detectors for different environment contexts), and/or any other step.

However, the set of measurements can be otherwise determined.

Generating an object representation using the set of measurements S300 can function to determine a partial representation for the object which can be used to determine a complete object representation (e.g., when combined with a second partial representation). S300 can be performed after each iteration of S200, after multiple iteration of S200, and/or at any other suitable time.

The object representation can be a representation of the measured or visible portion of grasped object (e.g., while grasped by the end effector, in the measurement volume, etc.). The representation can be associated with: a confidence level, scale, object size, any parameter associated with the measurement set (e.g., as described in S200), and/or any other parameter. The object representation is preferably a rough mesh, but can alternatively be a fully or partially refined mesh and/or any other object representation (e.g., image, point cloud, etc.).

Object representation can be scaleless, associated with an object size, associated with a scaled geometry, and/or associated with any other scale. The scale can be determined: based on a sample depth determined by the imaging system (e.g., by a depth sensor); based on an estimated end effector distance (e.g., from the imaging system; determined via dead reckoning) and an object pose relative to the end effector (e.g., from the set of measurements S200); based on the end effector feature size in an image frame (e.g., given a known end effector feature dimension); and/or otherwise determined. The feature can be a ArUco marker and/or other visual indicator.

Generating the object representation can optionally include segmenting out an image from each measurement in the set of measurements (e.g., using foreground and/or background segmentation). Object reconstruction techniques can then be used to reconstruct a 3D representation of the object (e.g., based on the segmented images). Object reconstruction techniques can include: using monocular cues, shape from shading, photometry, shape from texture, stereo correspondences to the depth for each pixel, Delaunay method, zero-set methods, and/or any other reconstruction technique.

In one embodiment, generating the object mesh includes: optionally determining a set of masks based on the set of measurements (e.g., images), then determining the object mesh based on the set of measurements and/or the set of masks. In examples, the object representation can be generated using methods described in U.S. application Ser. No. 17/375,331, entitled, "Method and System for Generating Training Data," filed Jul. 14, 2021, now U.S. Pat. No. 11,275,942, which is incorporated herein by reference in its entirety.

S300 can optionally include determining object components S320, adding keypoints S340, and/or modifying the object representation S360. These steps can be additionally or alternatively be performed during S500 (e.g., for the final object mesh) and/or at any other suitable time. An example is shown in FIG. 4.

Figure 4:
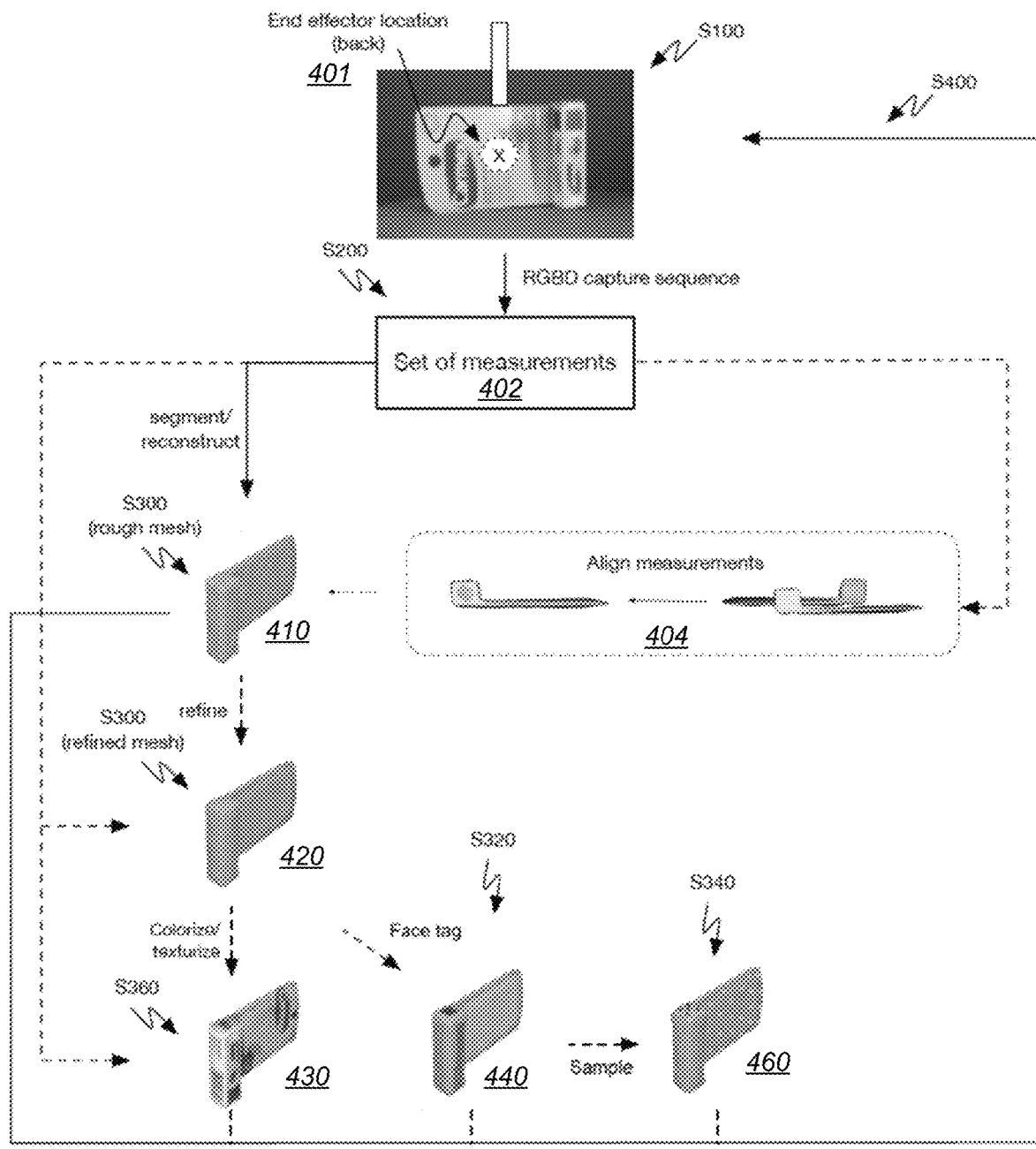
FIG. 4 depicts an example of the method.

FIG. 4 illustrates how the process can first obtain a set of measurements 402 from an RGBD capture sequence. An alignment process 404 can be performed to align the measurements in the set of measurements 402. From the aligned measurements, an initial rough mesh 410 of the object can be generated. This initial rough estimate can then be refined into a refined mesh 420. The refined mesh 420 can be modified to generate a colorized and/or texturized representation 430. The system can then in S320 generate a face tag representation 440 that distinguishes between the separately identifiable object faces. And finally, keypoints 460 can be added in S340.

S300 can optionally include aligning images in the set of measurements. Aligning the images can be performed when an object slip is detected (e.g., via actuation feedback sensors, measurements, etc.), after S200, during or after object representation generation (e.g., via ICP or other matching algorithms to align object representations from multiple measurement sets), prior to object representation reconstruction, and/or at any other time. Aligning the images can include registering two or more image frames to each other (e.g., based on shared object components and/or keypoints, an end effector location in each frame, etc.). However, images can be otherwise aligned.

S300 can optionally include segmenting out the end effector (e.g., from the set of images S200 and/or from the object representation). Segmenting out the end effector can include cropping out or otherwise identifying the end effector. In a first variant, this segmentation can include matching a known end effector template (e.g., geometry, mask, etc.) to the image or object representation (e.g., using a RCN). In this variant, the template can be matched based on an estimated end effector location (e.g., including components of the end effector such as fingers in a finger gripper). In a second variant, this segmentation can include determining an end effector segment (e.g., using a detector trained to ID end effector) and masking the end effector segment out from the image or object representation. However, segmenting out the end effector can be otherwise performed. As shown in FIG. 4, an initial image capture has masked out a location 401 of the end effector used to grasp the object.

However, generating an object representation can be otherwise performed.

Repeating S100-S300 for a second object S400 can function to generate one or more additional partial object representations. The second object can be the same object instance as the first object used in S100, a different object instance of the same object type as the first object (e.g., in a bin with two homogeneous objects, one object can be used for S100-300 and the other object can be used for S400), a different object type from the first object, and/or any other object.

Repeating S100 can include grasping the second object at a different grasping location than in a previous S100 iteration, with a different object orientation relative to the end effector and/or imaging system, using a different end effector (e.g., a different gripper, a different robotic arm, etc.), and/or any other grasping adjustment. Repeating S100 can be performed after or concurrently with the prior S100.

In a first variant, S400 includes releasing the first object from S100 and then re-grasping the second object using the same end effector. Releasing the first object can include placing the first object back in same location as it was previously located, placing the first object elsewhere (e.g., randomly, in a different bin, dropping where the end effector is currently located, etc.), placing with or without a specified orientation, and/or any other object placement. The release location can optionally be stored (e.g., in association with an object ID). Re-grasping the second object can be performed after releasing the first object (e.g., with or without other objects picked up and released in between) or at any suitable time. The second object can be selected for re-grasp: using any selection method in S100, to be the same object instance and/or type as S100 (e.g., based on: release location, the first set of measurements, the first object representation, object parameters, a new set of images, etc.), and/or via any other selection method.

In a second variant, the first object can be released (e.g., as described in the first variant) and the second object is re-grasped using a model trained to identify the visible object portions measured during a prior iteration. The model can be an intermediate object detector (e.g., a neural network, any model as described in S600, etc.) or a partially trained version of the final object detector. The re-grasp location is preferably targeted based on keypoints added to an object representation previously generated in S300, but alternatively can be based on measurements, object parameters, end effector location, and/or any other information. An illustrative example is shown in FIG. 5.

Figure 5:
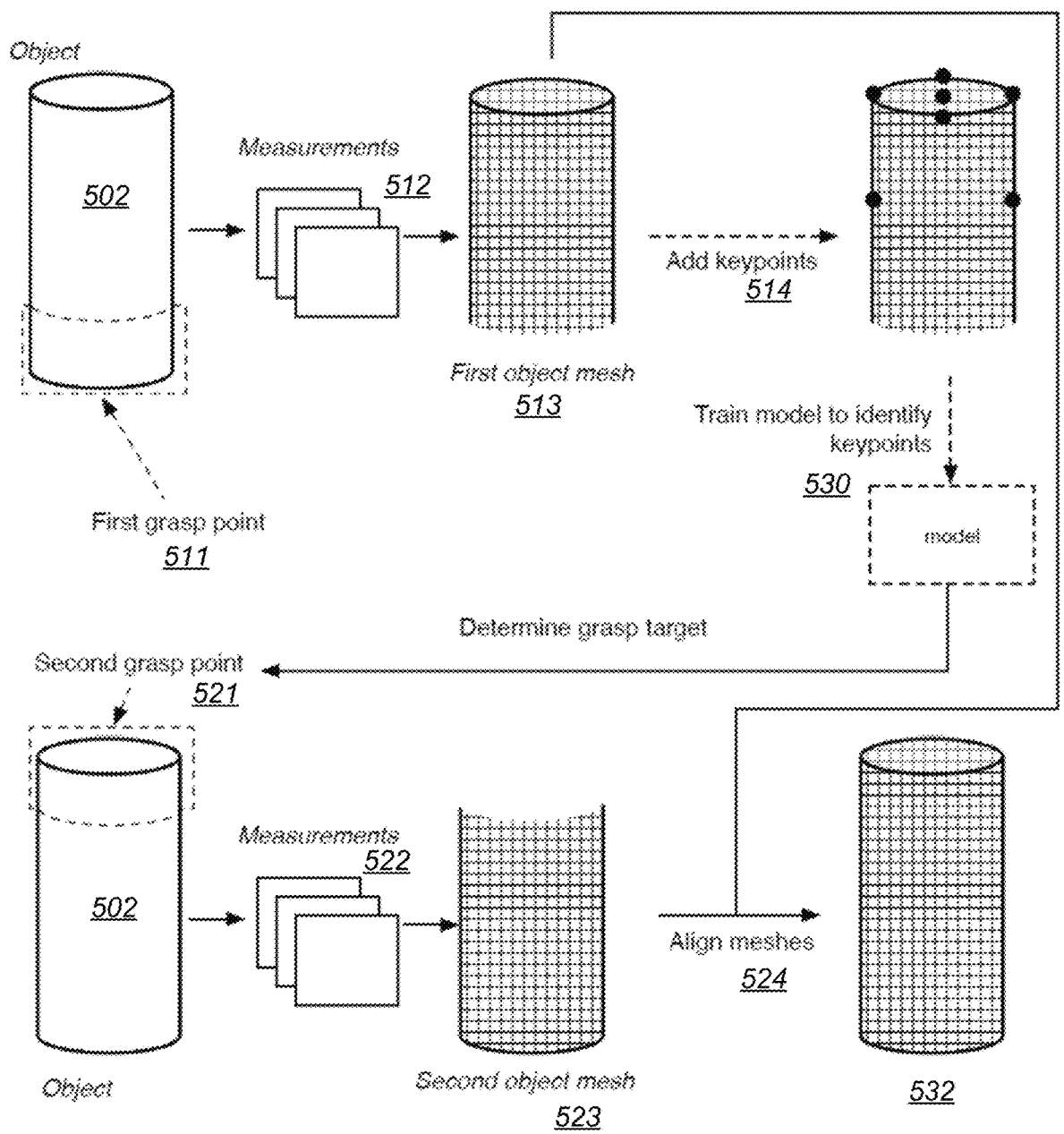
FIG. 5 depicts an illustrative example of the method, including a targeted grasp.

FIG. 5 illustrates an example of grasping an object 502 from two different grasp points. The object 502 is first grasped at a first grasp point 511, from which a first set of measurements 512 are taken. From the first set of measurements 512 a first object mesh 513 is generated, and keypoints 514 are added to the first object mesh 513. Because of how the end effector of the robot can obscure parts of the object being held, as shown in FIG. 5, the first object mesh 513 does not include data representing the part of the object 502 that was used for the first grasp point 511.

A model is then trained 530 to identify the keypoints 514 on the initial object mesh 513. Using that model, the system can identify a second grasp point 521. This process results in the second grasp point 521 obscuring a different portion of the object 502 than the first grasp point 511. Using the object grasped from the second grasp point 521, a second set of measurements 522 are taken, from which a second object mesh 523 can be generated. Like the first object mesh 513, the second object mesh 523 may also have incomplete data. However, a full representation 532 of the object 502 can be generated by combining the first object mesh 513 and the second object mesh 523 after aligning the meshes 524.

In a third variant, the second object is the same instance of the first object and re-grasping is performed by handing the object off from one end effector (e.g., the one used in S100) to a second end effector. The first and second end effectors can be associated with the same or different: imaging system, robot arm, measurement volume, and/or any other component.

In a fourth variant, the second object is the same instance of the first object and re-grasping is performed by adjusting the end effector grasp of the object (e.g., rotating or otherwise reorienting the object within the end effector grasp).

In a fifth variant, the second object is grasped with a different robot arm than S100. In this variant, S400 can be performed in parallel with S100 using different robot arms (e.g., with the same or different measurement volumes).

S400 can include repeating S200 and S300 for the second object. Preferably, the set of measurements in S200 are comparable for the first and second objects (e.g., the same number of object poses, similar environment context, etc.), but alternately the set of measurements can be noncomparable. The set measurements and/or the resulting object representation for the second object can be stored with the same or a different object ID as the previous iteration. Alternatively, the set of measurements and/or the object representation are not stored with an associated object ID.

S400 can be repeated until a stop condition is met. The stop condition can be evaluated continuously (450), after each mesh generation, for a batch of meshes, and/or at any other time. Alternatively or in addition, the stop condition is not evaluated (e.g., if S400 includes a targeted re-grasp of an object, the method can automatically continue to final object mesh generation S500).

The stop condition can be: a predetermined number of iterations (e.g., number of meshes generated per object), viewpoint coverage of the object surpassing a threshold, successful targeted re-grasp of the object (e.g., where the grasp is targeted to a location on the object where the first object representation has already been determined), the trained object detector's confidence score exceeding a threshold (e.g., wherein the object detector is iteratively trained on the measurement sets), and/or any other condition. The viewpoint coverage threshold can be determined such that: all sides of object have been captured, a 360° representation has been generated, a mesh has been generated above a confidence level, sufficient viewpoints have been acquired for an object detector to recognize the object from any orientation, the relationships between object representations from different iterations have satisfied a condition (e.g., an angular difference exceeding a threshold; alignment confidence exceeding a threshold, etc.), a model can predict the features in a set of test images of the object, and/or satisfaction of any other set of conditions.

Evaluating the stop condition can include aligning two or more object representations and determining if the stop condition is met (e.g., based on the alignment). The two object representations can be selected: from a database of generated representations (e.g., iterating through the database to find an alignment match; example shown in FIG. 8), using the previous two meshes generated (e.g., when re-grasp is performed on the same object instance, when a group of objects are homogeneous, etc.), using two representations associated with the same object ID, and/or using any other mesh selection method.

Figure 8:
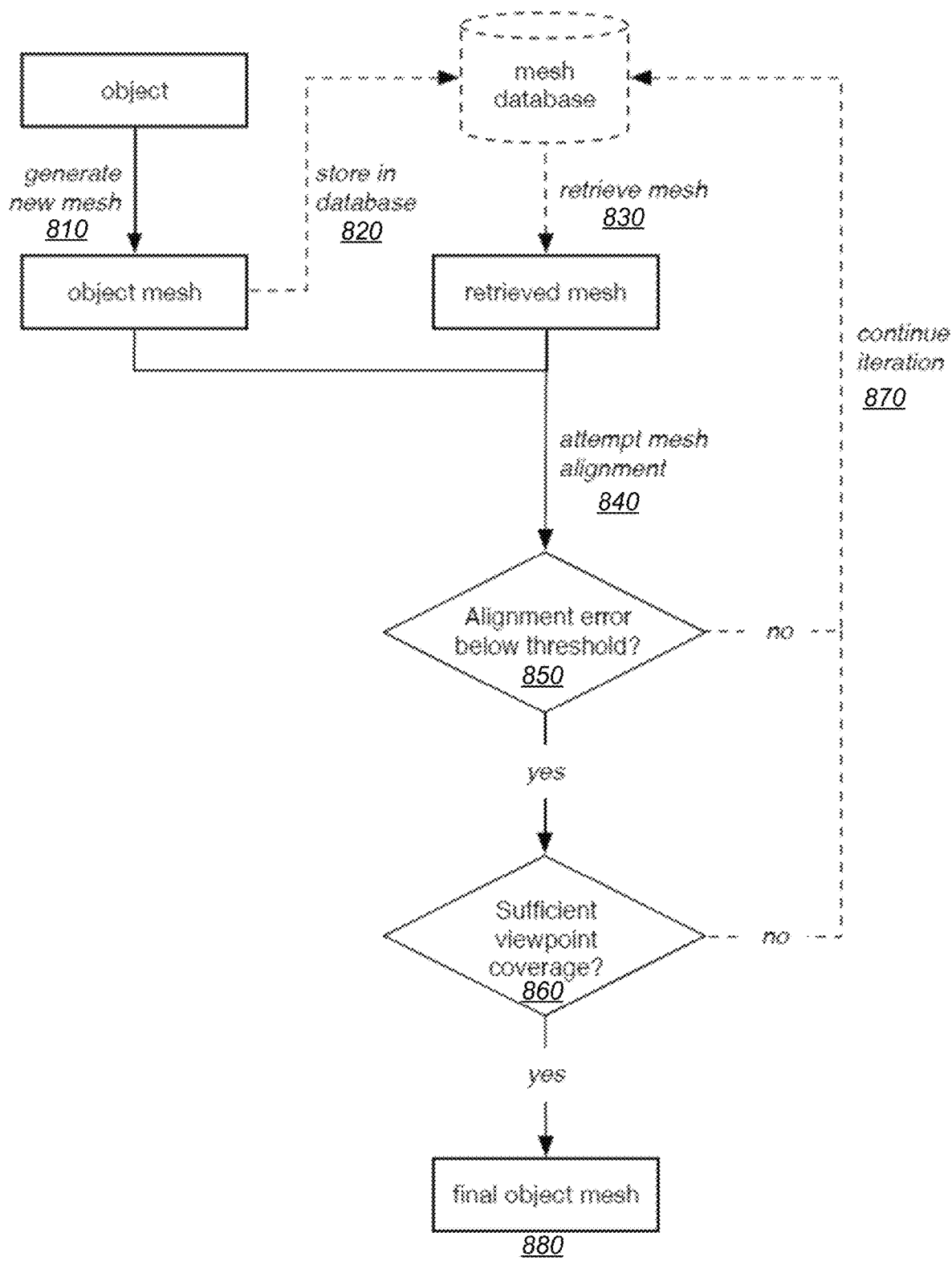
FIG. 8 is a schematic representation of an example of the method.

FIG. 8 illustrates how the system can iterate over previously generated object meshes to determine whether a stopping condition has been reached. The system first generates a new object mesh (810) and stores the mesh in a mesh database (820). The system can then retrieve a previously generated mesh (830) from the mesh database and can attempt to align (840) the retrieved mesh with the newly generated mesh from step 810. If an alignment error is below a threshold (branch 850), the system can then determine if the object has sufficient viewpoint coverage (860). If so, the system can determine that the stopping condition has been reached and can use the aligned meshes to generate a final object mesh (880).

If the alignment error was not below a threshold (850), or if the viewpoint coverage was not sufficient (860), the system can continue with another iteration (branch to 870). The alignment process on the right-hand-side of FIG. 8 can be performed in parallel with the system generating new object meshes to populate the mesh database. Thus, by the time another iteration is started (870), the mesh database may include one or more newly generated object meshes for consideration.

Aligning the two object representations can include orienting the two object representations relative to one another. The alignment can be performed with a rigid object assumption or without a rigidity assumption. The alignment can include an alignment error, with successful alignment determined based on a predetermined alignment error threshold. The alignment technique can be the same for all objects, selected based on object parameters (e.g., texture, symmetry, color, etc.), and/or otherwise determined.

In a first variant, feature-based alignment can be used to align two object representations. This variant can be used when the object surface is textured, but alternatively can be implemented when the object surface is untextured or for any other objects. The features can be an extracted SIFT feature point cloud from each object representation and/or can include object keypoints. In a first embodiment, if a predetermined number and/or percent of keypoints are matched between two meshes, then the meshes are aligned (e.g., followed by refinement and/or combination in S500); otherwise, the alignment is not performed and/or classified as unsuccessful. In a second embodiment, each SIFT keypoint is associated with one or more votes (e.g., a number of images from S200 or S400 that include the keypoint). When aligning the two representations, there are some number of scene-layers associated with the keypoints that agree with the transformation (e.g., determined from aligning keypoints). Each scene-layer has a number of images that voted on it. There is a predetermined threshold on the number of votes per scene-layer and when the number of votes is above the threshold, the refined meshes are successfully aligned.

In a second variant, geometry-based alignment is used. Preferably, this variant is implemented when the object surface is untextured (e.g., after attempting the first variant and/or evaluating the object texture), but alternatively the variant can be implemented when the object surface is textured or for any other objects. This variant can include one or more initial object representation transformation guesses (e.g., based on a grasp location as discussed in the fourth variant below, based on keypoints or other features from each representation, based on features from the image set, etc.). Alternatively, no initial transformation guesses are determined. The two representations can then be aligned using an ICP algorithm (e.g., including or not including color) and/or any other algorithm. The alignment is then selected such that alignment error is minimized and/or based on a predetermined alignment error threshold.

In a third variant, if one or more alignment techniques indicates sufficient ambiguity (e.g., when the object is sufficiently symmetrical and/or featureless), the stop condition can be satisfied.

In a fourth variant, alignment can be based on a re-grasp location in S400. In a first embodiment, when re-grasping is performed on a section of the object that has an associated representation, the second representation can be aligned to the first based on the end effector re-grasping location. In an illustrative example, when one portion of a cylinder has a known first mesh (e.g., with one circular face and half or more of the lateral area between the circular faces), a gripper can grasp the known circular face and position the cylinder for imaging of the unknown portion. The second mesh, including the unknown portion of the cylinder, can be aligned to the first mesh using knowledge of the second mesh location and orientation relative to the end-effector position (given that the end effector was positioned on the first known circular face and thus has a known alignment relative to the first mesh). In this example, the re-grasping can be targeted or untargeted. In a second embodiment, one or more object representations can be transformed based on the grasping location. In an illustrative example, if the object was re-grasped in S400 at an opposite location on the object than the first grasp in S100, the second object mesh from S400 can be flipped upside-down and rotated along the end-effector axis in discrete steps. The first and second meshes can then be aligned after each rotation (e.g., for N rotations; using ICP alignment or any other technique) and the alignment selected such that alignment error is minimized and/or based on a predetermined alignment error threshold.

Determining if the stop condition is met can be based on: object representation alignment; end effector grasping location(s); partial, complete, and/or combined object representations; a number of iterations and/or representations for a given object; measurements; and/or any other parameter.

In a first variant, if the alignment is unsuccessful (e.g., an alignment error above a predetermined threshold), the stop condition is not satisfied. If the alignment is successful, the stop condition may be satisfied (e.g., in the case of a targeted re-grasp) or may require further evaluation (e.g., as described in any of the following variants).

In a second variant, an angle between at least two object representations (e.g., as determined during alignment) is used to evaluate the stop condition. The angle can be between the representations' primary axes, the representation's principal components, between vectors opposing the end effector (e.g., based on the end effector grasping location on the object for each representation), and/or any other angle. If the angle is greater than a threshold (e.g., 60 deg, 80 deg, 100 deg, etc.), the viewpoint coverage can be classified as sufficient and the stop condition can be satisfied; an illustrative example is shown in FIG. 6.

Figure 6:
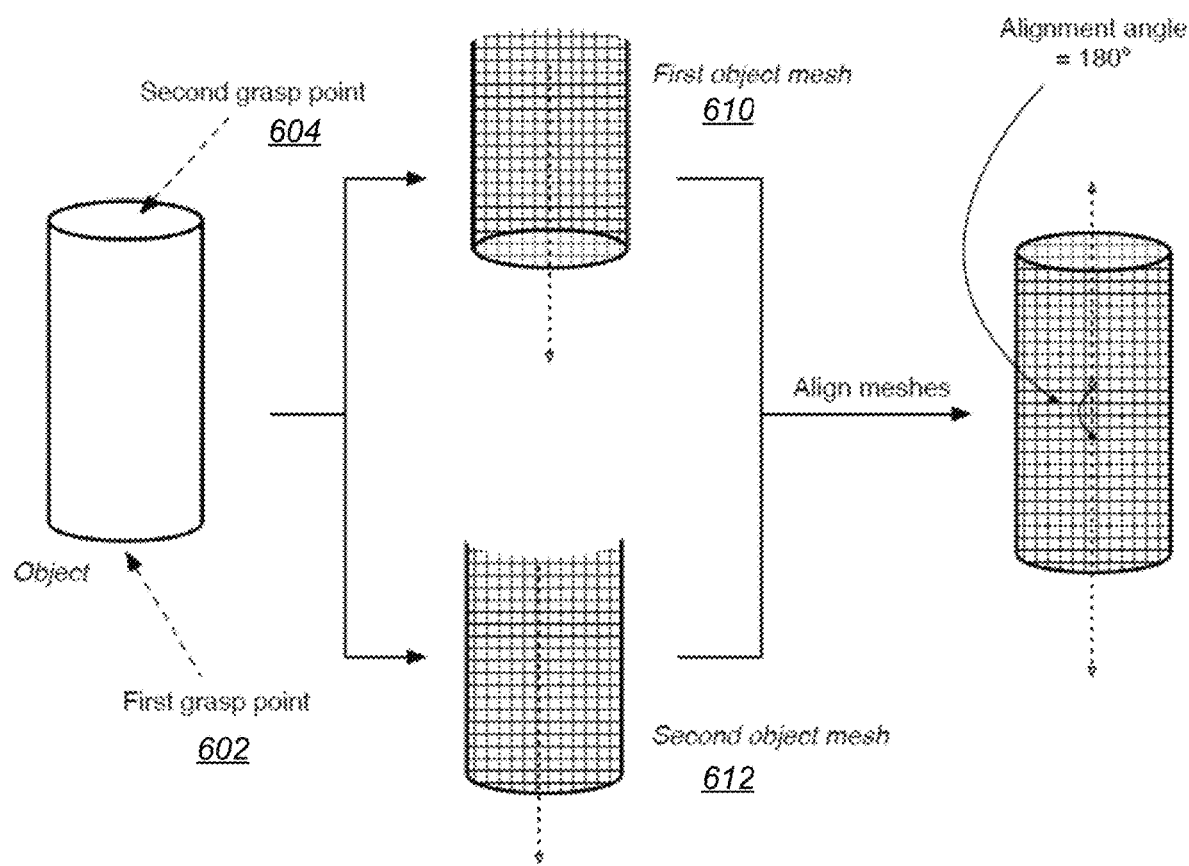
FIG. 6 depicts an illustrative example of the method, including sufficient viewpoint coverage.

FIG. 6 illustrates the object meshes 610 and 612 that were generated from grasping and measuring an object from a first grasp point 602 and a second grasp point 604. Due to a similar technique for holding the object, the first object mesh 610 and the second object mesh 612 have incomplete data at a same portion of the object. Aligning the meshes requires rotating one of the meshes 180 degrees in space, resulting in an alignment angle of 180 degrees. The system can then compare the resulting alignment angle to a threshold to determine if a stopping condition is satisfied.

Figure 7:
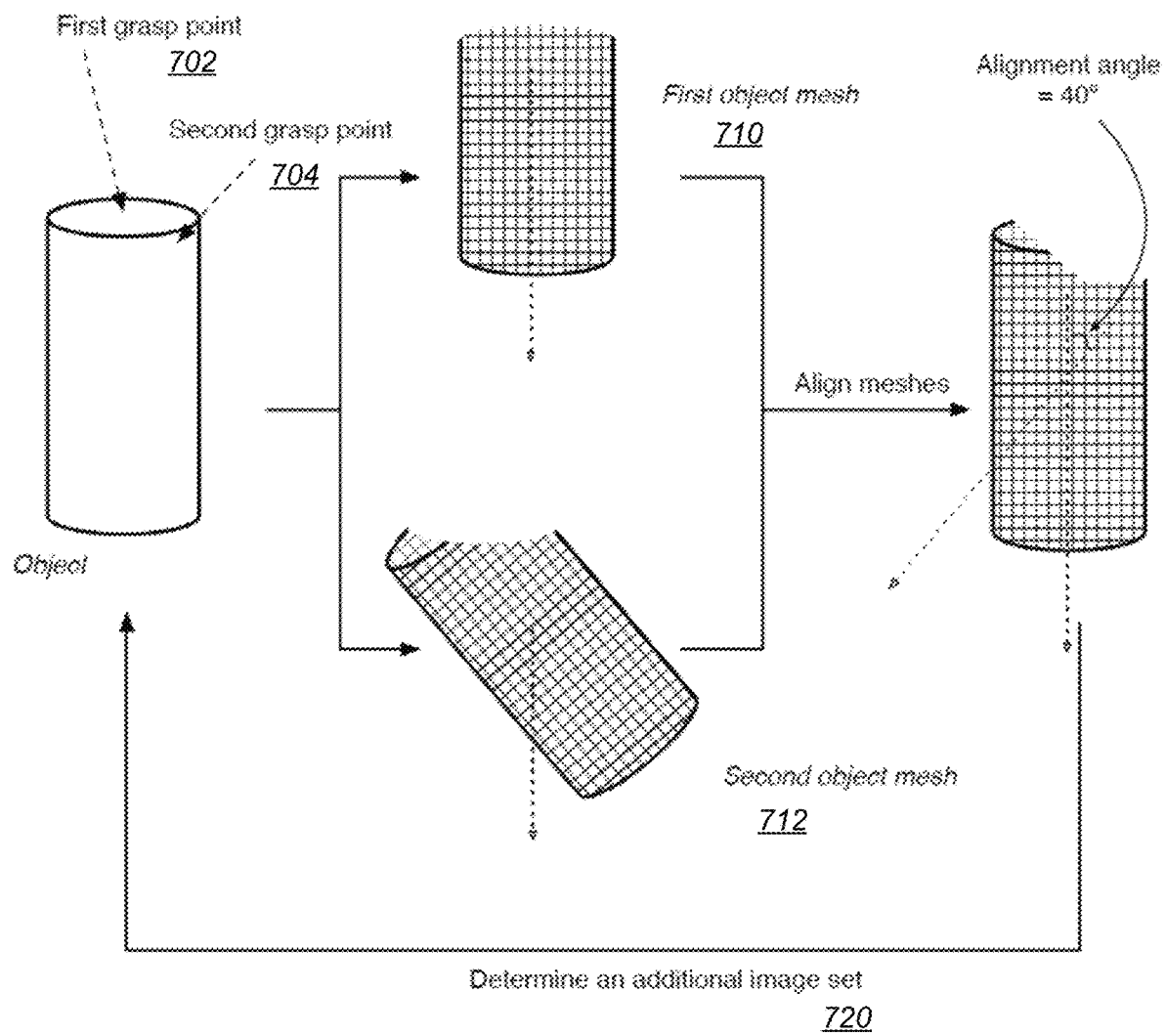
FIG. 7 depicts an illustrative example of the method, including insufficient viewpoint coverage.

If the angle is less than the threshold, the viewpoint coverage can be classified as insufficient and the stop condition can be not satisfied (e.g., additional meshes can be retrieved and/or generated for the object); an illustrative example is shown in FIG. 7.

FIG. 7 illustrates a situation in which the alignment angle was insufficient to satisfy a stopping condition. In this example, the first grasp point 702 and the second grasp point 704 were on a same end of the object. As a result, the first object mesh 710 and the second object mesh 720 required an alignment angle of only 40 degrees. In this example, the system can determine that the alignment angle is insufficient to satisfy a stopping condition, and, as a result the system can perform another iteration 720 to determine an additional set of image measurements using a third grasp point.

In a third variant, a distance between at least two object representations (e.g., as determined during alignment) is used to evaluate the stop condition. The distance can be a vector distance based on: object representation centroids, a common known point in both representations, and/or any other distance. If the distance is greater than a threshold, the viewpoint coverage can be classified as sufficient and the stop condition can be satisfied. The threshold can be: a predetermined value, a percentage of the object size, based on known object parameters, based on the end effector size and/or geometry (e.g., such that the threshold distance ensures the full mesh can be compiled even if the same object face has been grasped), and/or any other distance threshold.

In a fourth variant, adding and/or adjusting keypoints on one or more object representations can be used to evaluate the stop condition (e.g., based on a number of keypoints added, the distance between keypoints between two stages of keypoints, the rate of change of the number of keypoints, etc.).

In a fifth variant, for each representation in a set, the location of the end effector can be labeled or otherwise denoted relative to the representation (e.g., based on the end effector segmentation location, based on mesh generation over unknown portions of the object obscured by the end effector, etc.). If all end effector locations have been covered by the other representation(s) in the set, the stop condition can be met.

In variants, object representations can be combined (e.g., using techniques in S500) even if the stop condition is not met (e.g., if the alignment was successful but the angle below the stop condition threshold). Any object representation used in any portion of the method can be a combined object representation.

However, repeating S100-S300 can be otherwise performed.

Figure 10:
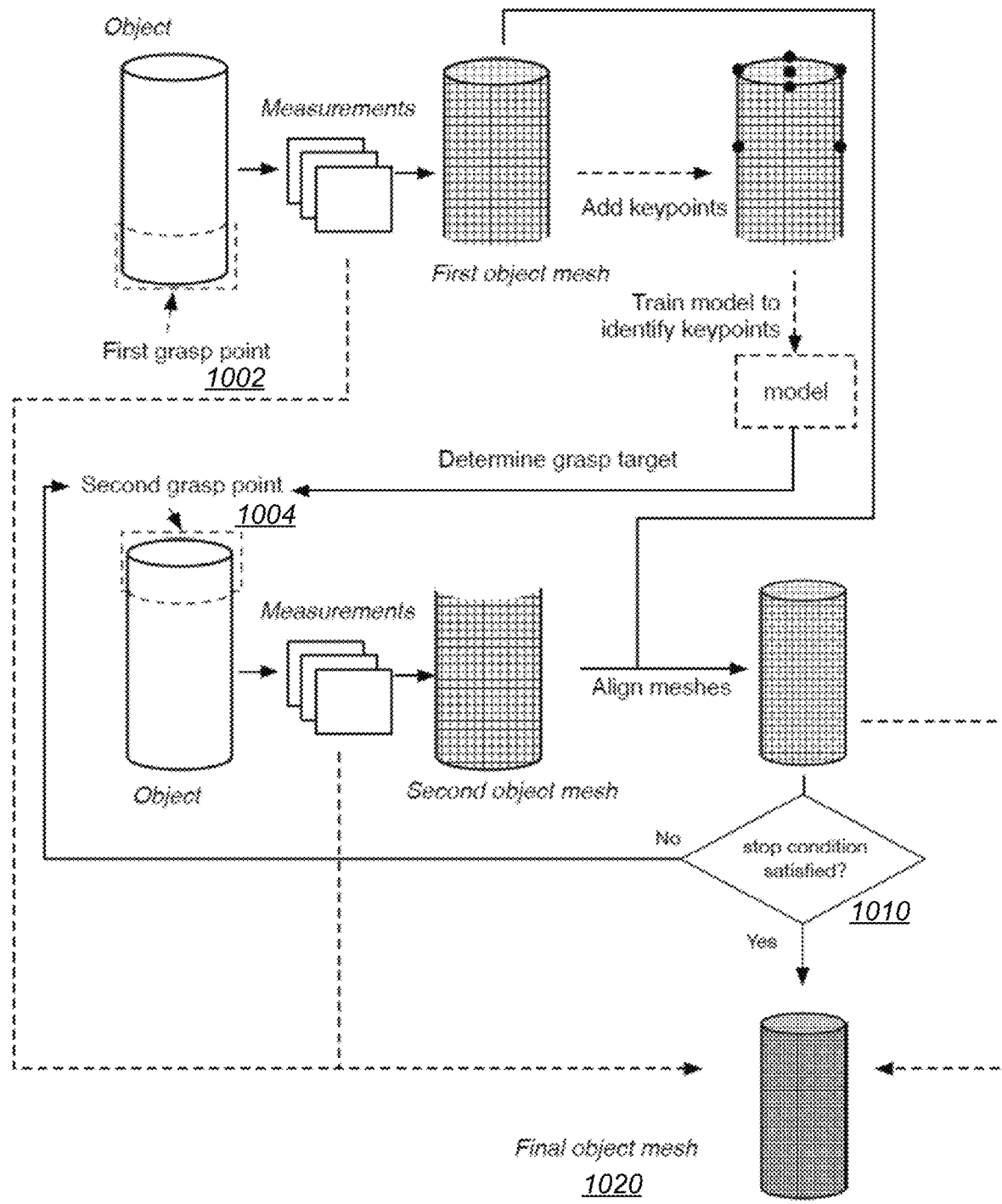
FIG. 10 is an illustrative example of refined object mesh generation.

Generating a final object representation S500 can function to determine a complete 360-degree representation of the object. Generating the final object representation can be partially or completely performed after S400 (e.g., after a stop condition is met), during S400 (e.g., aligning representations in S400 and if the viewpoint coverage is sufficient, the aligned mesh is the final mesh), after keypoints have been added to one or more object representations, and/or at any other suitable time. The final object representation can be determined based on: two or more object representations (e.g., as detailed in S400), one or more measurement sets (e.g., used to determine the object representations), object parameters, and/or other information. An example is shown in FIG. 10. However, the final object representation can be otherwise generated.

FIG. 10 illustrates a similar process described above with respect to FIG. 5, augmented with stopping condition logic. From a first grasp point 1002 and a different second grasp point 1004, the system can perform a mesh alignment process and determine if a stopping condition is satisfied (1010). If not, the system can return to select another different grasp point. If so, the system can use the aligned meshes to generate a final object mesh 1020.

Training an object detector based on the final object representation S600 can function to train one or more object detectors for object detection (e.g., detecting keypoints based on images). S600 can be performed after the stop condition is met, iteratively throughout the method (e.g., after each instance of S300), and/or at any other suitable time. The object detector can be a: neural network (e.g., feed forward neural network, RNN, CNN, etc.); Viola-Jones object detection model; SIFT model, HOG model, graphical model (e.g., RCN, Bayesian network, etc.), and/or any other suitable detector. The detector can be trained using: the measurement sets sampled from iterations of S100, a final object representation generated therefrom, the intermediate object representations from iterations of S300, synthetic images generated from the object representation (e.g., synthetic images of virtual piles of the object representation), and/or any other suitable training data. The training data can be labelled with: object instances, face identifiers, keypoints, object parameters (e.g., pose, depth, orientation, etc.), and/or any other suitable information. The detector can be trained to determine one or more training labels associated with an image (e.g., a synthetic image and/or training data image). However, the object detector can be otherwise trained.

The method can optionally include detecting objects using the object detector S700. S700 can function to detect objects (e.g., object bounding boxes) and/or object features in deployment environments based on sampled images of a scene. The object and/or feature detection output by the object detector can be used to enable: object selection, object grasping (e.g., selecting a contact point and/or location), object insertion, image stitching by matching the keypoints across images, navigation (e.g., object and/or feature avoidance, object presence to enable more accurate navigation, etc.), and/or any other suitable application. However, detecting objects can be otherwise performed.

S700 can optionally be used to select an object detector from a set of detectors (e.g., where the most successful detector is selected) and/or to influence detector training (e.g., based on detected failures or successes, to generate additional object meshes and/or training data using the method, etc.).

In examples, the method can include all or portions of the methods described in U.S. patent application Ser. No. 17/375,424, entitled, "Method and System for Object Grasping," filed Jul. 14, 2021; and U.S. application Ser. No. 17/375,331, entitled, "Method and System for Generating Training Data," filed Jul. 14, 2021, now U.S. Pat. No. 11,275,942, each of which is incorporated by reference in its entirety.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   identifying, by a sensor associated with a robot, a first grasp point for an object to be automatically modeled;
   grasping, by the robot, the object at the first grasp point;
   obtaining one or more first sensor measurements of the object;
   generating a first partial object mesh based on the one or more first sensor measurements of the object when held by the robot at the first grasp point;
   identifying a second grasp point for the object that is located in a region captured by the one or more first sensor measurements;
   grasping, by the robot, the object at the second grasp point;
   obtaining one or more second sensor measurements for the object;
   generating a second partial object mesh based on the one or more second sensor measurements of the object when held by the robot at the second grasp point;
   generating a final object mesh for the object including aligning and merging the first partial object mesh and the second partial object mesh; and
   repeatedly generating additional partial object meshes until determining that a stopping condition is reached, wherein determining that the stopping condition is reached comprises:
     generating an alignment angle from aligning a first partial object mesh and an additional partial object mesh; and
     determining that the alignment angle satisfies a threshold.

2. The method of claim 1, wherein determining that a stopping condition is reached comprises:
   computing a distance between a first partial object mesh and an additional partial object mesh; and
   determining that the distance satisfies a threshold.

3. The method of claim 1, wherein determining that a stopping condition is reached comprises:
   computing a viewpoint coverage provided by the first partial object mesh and one or more other partial object meshes; and
   determining that the viewpoint coverage satisfies a threshold.

4. The method of claim 1, wherein the end effector of the robot obscures a portion of the object when held by the second grasp point that was not obscured when held by the first grasp point.

5. The method of claim 1, further comprising training an object detector using the automatically generated final object mesh.

6. The method of claim 5, further comprising using the trained object detector to detect one or more objects.

7. A system comprising:
   one or more computers and one or more storage devices storing instructions that are operable, when executed by the one or more computers, to cause the one or more computers to perform operations comprising:
     identifying, by a sensor associated with a robot, a first grasp point for an object to be automatically modeled;
     grasping, by the robot, the object at the first grasp point;
     obtaining one or more first sensor measurements of the object;
     generating a first partial object mesh based on the one or more first sensor measurements of the object when held by the robot at the first grasp point;
     identifying a second grasp point for the object that is located in a region captured by the one or more first sensor measurements;
     grasping, by the robot, the object at the second grasp point;
     obtaining one or more second sensor measurements for the object;
     generating a second partial object mesh based on the one or more second sensor measurements of the object when held by the robot at the second grasp point;
     generating a final object mesh for the object including aligning and merging the first partial object mesh and the second partial object mesh; and
     repeatedly generating additional partial object meshes until determining that a stopping condition is reached, wherein determining that the stopping condition is reached comprises:
       generating an alignment angle from aligning a first partial object mesh and an additional partial object mesh; and
       determining that the alignment angle satisfies a threshold.

8. The system of claim 7, wherein determining that a stopping condition is reached comprises:
   computing a distance between a first partial object mesh and an additional partial object mesh; and
   determining that the distance satisfies a threshold.

9. The system of claim 7, wherein determining that a stopping condition is reached comprises:
   computing a viewpoint coverage provided by the first partial object mesh and one or more other partial object meshes; and determining that the viewpoint coverage satisfies a threshold.

10. The system of claim 7, wherein the end effector of the robot obscures a portion of the object when held by the second grasp point that was not obscured when held by the first grasp point.

11. The system of claim 7, wherein the operations further comprise training an object detector using the automatically generated final object mesh.

12. The system of claim 11, wherein the operations further comprise using the trained object detector to detect one or more objects.

13. One or more non-transitory computer storage media encoded with computer program instructions that when executed by one or more computers cause the one or more computers to perform operations comprising:
- identifying, by a sensor associated with a robot, a first grasp point for an object to be automatically modeled;
- grasping, by the robot, the object at the first grasp point;
- obtaining one or more first sensor measurements of the object;
- generating a first partial object mesh based on the one or more first sensor measurements of the object when held by the robot at the first grasp point;
- identifying a second grasp point for the object that is located in a region captured by the one or more first sensor measurements;
- grasping, by the robot, the object at the second grasp point;
- obtaining one or more second sensor measurements for the object;
- generating a second partial object mesh based on the one or more second sensor measurements of the object when held by the robot at the second grasp point;
- generating a final object mesh for the object including aligning and merging the first partial object mesh and the second partial object mesh; and
- repeatedly generating additional partial object meshes until determining that a stopping condition is reached, wherein determining that the stopping condition is reached comprises:
  - generating an alignment angle from aligning a first partial object mesh and an additional partial object mesh; and
  - determining that the alignment angle satisfies a threshold.

14. The one or more computer storage media of claim 13, wherein determining that a stopping condition is reached comprises:
- computing a distance between a first partial object mesh and an additional partial object mesh; and
- determining that the distance satisfies a threshold.

* * * * *